United States Patent [19]

Maddy et al.

[11] Patent Number: 4,596,282
[45] Date of Patent: Jun. 24, 1986

[54] HEAT TREATED HIGH STRENGTH BIMETALLIC CYLINDER

[75] Inventors: Woodrow D. Maddy, Dublin; Giri Rajendran, Radford, both of Va.

[73] Assignee: Xaloy, Inc., Pulaski, Va.

[21] Appl. No.: 732,082

[22] Filed: May 9, 1985

[51] Int. Cl.⁴ ............................................. B22D 19/08
[52] U.S. Cl. .................................. 164/76.1; 148/127; 148/143
[58] Field of Search .................. 164/76.1, 95, 98, 99; 148/127, 143

[56] References Cited

U.S. PATENT DOCUMENTS 3,658,515  4/1972  Saltzman ........................... 75/128 F Primary Examiner—Kuang Y. Lin
Attorney, Agent, or Firm—Ostrolenk, Faber, Gerb & Soffen

[57] ABSTRACT

A high strength bimetallic cylinder having a wear-resistant ferrous liner or inlay and capable of withstanding high stresses is provided by a heat treatment process wherein the cylinder steel is transformed into the austenitic phase, followed by rapidly cooling the cylinder to an intermediate temperature so that the ferrous outer housing is transformed to a bainitic structure, and then slowly cooling the cylinder to transform the ferrous liner into a martensitic structure.

8 Claims, No Drawings

HEAT TREATED HIGH STRENGTH BIMETALLIC CYLINDER

BACKGROUND OF THE INVENTION

This invention relates to a high strength bimetallic cylinder and a process for its manufacture. Bimetallic cylinders find particular use in injection molding or extrusion operations.

Injection molding is a process for forming articles from plastics, wherein a heated, fused plastic is forced under pressure into a mold cavity to solidify in the shape and size of the cavity. The charge of plastic material to be injected into the mold cavity must be heated and pressurized prior to injection, and in one approach, the plastic starting material is fed into a hollow cylinder having a screw therethrough. As the screw turns, the plastics forced into a heated zone of the cylinder ahead of a check ring on the head of the screw, so that a predetermined volume of heated, pressurized plastic is prepared for subsequent injection into the mold cavity by a forward movement of the screw and check ring within the cylinder.

Because the economics of injection molding depend upon attainment of long operation lives for the machinery, it is important that the inner lining of the cylinder have a high resistance to wear and corrosion by the heated plastic material. Should the inside of the cylinder wear away so that the inner diameter of the cylinder is enlarged, a clearance develops between the check ring and screw, and the inner wall of the cylinder so that the plastic material leaks back from the pressurized zone, with the result that the necessary pressure for injection molding will not be developed. The cylinder must then be refurbished or replaced, or a larger diameter check ring must be utilized and, in any event, the economic production process is interrupted.

One process currently used for providing a cylinder having a highly wear resistant and corrosion resistant inner lining, while at the same time having an outer portion with high strength and toughness is a nitriding process. Here, the inside of a steel cylinder is nitrided by exposing the inner wall of the cylinder to a nitrogen containing gas such as ammonia, at elevated temperatures. This process results in a relatively thin layer, i.e., 0.005"–0.020", of hardened steel on the inside of the cylinder. Due to the decreasing hardness, with respect to depth, the wear rate will accelerate as material is worn away. For this reason, nitriding is not considered an adequate process for the high wear applications as experienced in extrusion and injection molding equipment.

Another process for providing a cylinder with a lining having improved wear resistance properties uses centrifugal casting. In this process, ingredients suitable for forming an inner layer within the cylinder are loaded with a pre-machined cylindrical outer steel housing. The ends are then sealed, the housing is placed in a furnace at a temperature sufficiently high to melt the inner layer but not the housing, and the cylindrical housing is then rotated rapidly about its axis to distribute the molten ingredients in a continuous layer about the inside of the housing. Upon cooling, the inner layer is metallurgically bonded to the cylindrical outer housing, and the inner layer may then be machined or honed to form a smooth bore of constant diameter to receive the screw and check ring. Boring is preferred to honing since it is less expensive and faster. However, if the lining or inlay is too hard, it cannot be bored and must be ground or honed. Other wear surfacing methods that could be used to apply the liner material to the I.D. of the outer housing include: (1) hot isostatic pressing; (2) plasma transfered arc welding; (3) thermal spray and laser fusion; and (4) direct laser cladding.

The use of ferrous alloys to line a steel housing to form a bimetallic cylinder is known. U.S. Pat. Nos. 2,046,912; 2,046,913; 3,334,996; and 3,658,515 disclose alloys for such use.

The present invention provides a method for making an improved bimetallic, high strength cylinder having a high strength steel backing outer shell with a hard, wear and corrosion-resistant liner or inlay. It should be recognized that the backing steel must have a high yield strength to support high internal pressure without plastic deformation because the hard liner alloy is brittle and will crack with little deformation. It has not previously been possible to manufacture a wear and corrosion resistant liner together with a high strength backing steel. It has previously been necessary to use a heat treated sleeve on the high pressure end of the injection molding cylinder in order to withstand the high stresses at the bore and at the leading edge of the bolt holes that result from injection pressures of 20,000 psi and above.

The use of a heat treated sleeve on the high pressure end of a cylinder used in injection molding has the disadvantage that the remainder of the cylinder is exposed to high pressures that might accidentally occur in processing environments if a cold start were experienced. A cold start occurs when an injection molding machine is shut down with material still in the cylinder. The material cools and becomes a solid plug. When the machine is restarted and, until the plug melts, pressures can be generated in the normally low pressure area of sufficient magnitude to permanently deform the cylinder, rendering it useless.

The reason that it has not been possible to supply a wear and corrosion resistant liner with a high strength backing steel is that when the backing steel is hardened by traditional heat treatment, i.e. quenching from the austenitic phase temperature to room temperature, the hard liner material tends to crack. The traditional practice of hardening steel consists of heating the steel to a high temperature, in the range of 1500°–1900° F. At this temperature, both the liner and backing steel material become austenitic in phase structure. If this material is then rapidly cooled to room temperature, the austenite transforms to another crystalline structure, martensite, which is very brittle and resistant to deformation. However, transformation of austenite to martensite is accompanied by a volume expansion and it is this expansion in the backing steel which would tend to crack conventional hard liner materials such as that described in U.S. Pat. No. 3,658,515 in the bimetallic cylinder during heat treatment.

SUMMARY OF THE INVENTION

The present invention provides an improved bimetallic cylinder and a method for making the bimetallic cylinder. The cylinder has a high strength housing or backing steel and a ferrous alloy liner or inlay. The high strength of the backing and relatively high liner hardness are achieved by post heat treatment of the composite cylinder after the liner has been formed on the inside of the cylinder. This provides the advantage that the bimetallic cylinder can be bored instead of honed prior to the heat treatment thereby substantially reducing the need for the relatively expensive honing process needed after heat treatment.

The backing steel of the present invention is strengthened by rapidly cooling from the austenitizing range to an intermediate temperature, after which the steel is slowly cooled at a controlled rate, and transformed into a substantially bainitic structure having a hardness, preferably between 30–50 Rockwell C. At this intermediate temperature, the liner material is still sufficiently tough and ductile to absorb the small expansion that takes place on the transformation of the backing steel. Such intermediate temperature is typically between about 500° F. and 800° F. Upon cooling from the temperature at which the backing steel transforms to bainite, the liner alloy transforms to predominantly martensite.

An object of the invention is to provide an improved high strength bimetallic cylinder with a post-heat treatable liner material that doesn't crack when the composite cylinder is heat treated to impart high strength to the backing material and adequate hardness to the liner.

Another object of the invention is to provide an improved method for making a bimetallic cylinder where the liner is bored prior to the hardening of the steel backing.

A further object of the invention is to provide an improved bimetallic cylinder which is wear and corrosion resistant and does not require the latter addition of a heat treated sleeve, as is necessary in conventional bimetallic cylinders where the backing does not possess sufficient strength to withstand high internal pressures.

A still further object of the invention is to provide an improved cylinder of a high strength steel backing and ferrous alloy liner which, when manufactured according to the present invention, provides both corrosion and abrasion wear resistance in the liner material.

In accordance with the invention backing steel cylinders are made of carbon or low alloy steels, such as AISI-SAE designated alloy steels 4140, 4340, 8620, and 6150, which have sufficient hardenability to avoid formation of undesirable high temperature transformation products during cooling from the austenitizing temperature.

Liner materials used in the invention are ferrous alloys which have a transformation temperature to martensite below the temperature at which the backing steel transforms to bainite. Such materials would include alloys of the following composition:

| Ingredient | Range of wt. % |
|---|---|
| Carbon | 2.5 to 6 |
| Manganese | .5 to 1.5 |
| Silicon | .2 to 2 |
| Chromium | 20 to 35 |
| Nickel | up to 8 |
| Molybdenum | up to 3 |
| Phosphorus | up to .04 |
| Sulfur | up to .03 |
| Vanadium | up to 1 |
| Boron | up to 3 |
| Iron | Balance to make 100% |

The expression "up to" a specified percentage is intended to include 0 percent of the indicated component. In addition, any phosphorous or sulfur present exist as impurities.

Other suitable alloys include nickel-chromium white irons containing 3–5% Ni and 1½–2½% Cr and sold under the trademark "Ni-Hard." Also suitable are chromium-molybdenum white irons containing 14–20% Cr and 1–3% Mo, and hard ferrous alloys, such as those described in U.S. Pat. No. 3,334,996. In any event, one should consult published time-temperature transformation charts to determine that alloys used in the liner convert to martensite at a temperature lower than the bainite conversion temperature for the selected backing metal.

In any event, the hard ferrous alloy inlay or liner is one which, upon cooling from the austenitizing temperature, transforms substantially into a martensite structure having a typical hardness of 58–65 Rc, and preferably between 62–64 Rc.

In accordance with the present invention, a bimetallic cylinder is prepared, such as by centrifugal casting, in which the relatively soft liner is deposited on the inside of an outer housing made of low alloy steel such as AISI-SAE 4140 steel. Prior to the depositing of the liner, the steel cylinder is pre-bored. After the liner is deposited, but before the heat treatment of the bimetallic cylinder, the liner is rough-machined. The relatively soft liner and outer housing facilitate the machining operation at this point.

The cylinder is then heat treated by placing it in a pre-heated furnace. The cylinder, in the furnace, is allowed to reach an O.D. temperature of about 1500° F. to 1900° F. and held at that temperature for about 30 to 90 minutes, depending on the mass of the cylinder. The cylinder is then rapidly cooled to 500° F. to 800° F. by water quenching, preferably along with forced air cooling, so that the cylinder temperature reaches 500° F. to 800° F. in less than 5 minutes, and preferably less than 2 minutes. It is then slowly cooled at a controlled rate, until it reaches ambient temperature. The slow cooling rate depends on the size and thickness of the cylinder, but typically would be between about 50° to 150° F. per hour.

DETAILED DESCRIPTION OF PREFERRED EMBODIMENTS

A cylinder is made of AISI 4140 steel and prebored to an I.D. dimension of 0.124" over the desired finish size. The liner alloy is loaded into the interior of the steel tube and steel caps are then welded on to each end of the cylinder to contain the load during centrifugal casting. The air inside the tube is evacuated and backfilled with argon gas, used to prevent oxidation during casting. The sealed tube is placed in a furnace preheated to 2420° F. to 2460° F. and removed from the furnace when the O.D. of the cylinder reaches about 2410° F. The cylinder is then rapidly transferred to a centrifugal spinner and spun at a speed sufficient to generate a 75 G force on the I.D. of the cylinder. The spinning continues until the O.D. of the cylinder reaches a temperature of about 1600° F. The cylinder is slow cooled to room temperature over a period of two days by placing it in a cooling pit and covering it with with an insulating material, such as vermiculite. Following cooling, the cylinder is rough bored to an internal dimension from 0.012" to 0.025" less than the desired finish dimension.

The cylinder is then heat-treated. It is placed in a furnace pre-heated to about 1900° to 2150° F. and allowed to reach an O.D. temperature, as measured by an optical pyrometer of about 1900° F. and held at that temperature for about 45 minutes. The cylinder is then rapidly transferred to a spinner and spun until the O.D.

temperature reaches about 600° F. During the cooling cycle on the spinner, both water and forced air are used to obtain the desired cooling rate during the treatment cycle with a typical total cooling time being about 5 minutes. When the O.D. reaches about 600° F. it is removed from the spinner and cool slowly to ambient temperature. The cylinder is then honed and machined to the final dimensions.

It should be recognized that the cooling rates may vary with the use of different backing steels and liner material within the scope of the invention. Different cooling rates are also required for different sized cylinders. In all instances, the cooling rates used in the heat treatment must be adequate to complete substantial bainitic transformation in the backing steel at a temperature above the start of the martensitic transformation of the alloy liner. Thus, the liners herein disclosed can absorb any expansion in the backing before it converts to the more brittle martensite structure.

It should now be appreciated that the composite cylinder made in accordance with the instant invention does not need an additional heat treated sleeve to withstand the pressures encountered when used in the injection molding process.

The following examples will serve to illustrate the present invention without limiting its scope.

EXAMPLES

In these examples the liners were prepared by centrifugal casting as described above in the preferred embodiment.

EXAMPLE 1

An alloy of the following composition was placed into a 4140 steel cylinder.

| Ingredient | Range of wt. % |
| --- | --- |
| Carbon | 2.87 |
| Manganese | 1.30 |
| Silicon | 1.15 |
| Chromium | 28.20 |
| Nickel | 0.13 |
| Molybdenum | 0.62 |
| Phosphorus | 0.04 |
| Sulfur | 0.03 |
| Vanadium | 0.29 |
| Iron | Balance to 100% |

The centrifugal casting was performed in which the cylinder was heated to an O.D. temperature of 2410° F. The cylinder was pre-bored to a dimension of 0.124" over the desired finish I.D. of 1.757". The alloy was then cast into the cylinder, cooled and subsequently rough machined to a dimension of 1.747" I.D.×3.85" O.D.×32.500" length. The machining was relatively easy due to the backing steel and liner being soft at this point in the process.

The cylinder was then heat treated in a furnace that was pre-balanced at 2100° F. The cylinder was allowed to reach an O.D. temperature of 1900° F. and held at that temperature for a period of 45 minutes. The cylinder was then transferred to a centrifugal spinner and spun until the O.D. temperature reached approximately 600° F. During the cooling cycle on the spinner, both water and forced air were used to achieve the desired cooling rate during the heat treatment cycle. When the O.D. reached the 600° F. range, it was removed from the spinner and slowly cooled to room temperature over a period of 5 hours.

Sectioning of the cylinder showed that the hardness of the backing steel was 50 Rc and had a yield strength of 247,000 psi and a tensile strength of 271,000 psi. Pressure testing was performed on the remaining portion of the tube after machining to the following dimensions: 1.757" I.D.×3.750" O.D.×24" length. The liner material did not crack until a pressure of 55,000 psi equivalent to a hoop stress at failure of 85,600 psi. The liner had a hardness of 64 Rc. A metallurgical evaluation for the resulting structures showed that the heat treated backing steel had transformed substantially to a bainitic structure and the hard liner had transformed to substantially to a martensitic structure containing primary carbides.

EXAMPLE 2

A cylinder was prepared as in Example 1 except that the subsequent heat treatment was not performed. The hardness of the backing steel was found to be only 18–20 Rc with a yield strength of only 60,000 psi which would cause the liner to crack at less than 30,000 psi. The liner had a thickness of only 35–45 Rc.

EXAMPLE 3

A cylinder was prepared as in Example 1 except that the liner was the iron-nickel-boron alloy of U.S. Pat. No. 3,658,515 (col. 2, lines 1–8). The hardness of the backing steel was found to be 15–18 Rc with a yield strength of 15,000 psi. The liner hardness ranged from 60–62 Rc.

The cylinder in Example 3 was subjected to the same heat treatment as the cylinder in Example 1. The backing steel hardness was found to be 35–40 Rc, but the liner was cracked all through, because the liner alloy converted to brittle martensite at approximately the same temperature as the backing or shell transformed to bainite.

From the above, it is apparent that the bimetallic cylinders of the present invention are superior to those using liner materials which convert to martensite along with conversion of the backing to martensite.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A method for manufacturing a high strength bimetallic cylinder comprising the steps of:
   depositing a wear and corrosion resistant ferrous alloy liner in a steel cylinder;
   heat treating the cylinder by heating to a temperature sufficient to form an austenitic phase in the cylinder, cooling the cylinder to an intermediate temperature, which is above the start of the martensitic transformation temperature of the alloy liner, so that the ferrous outer casing is transformed to a bainitic structure, and then further cooling the cylinder so that the ferrous alloy liner is transformed into a martensitic structure.

2. The method of claim 1, wherein the inner diameter of the bimetallic cylinder is bored prior to the heat treatment.

3. The method of claim 1, wherein the steel of the cylinder backing is AISI 4140 steel.

4. The method of claim 2, wherein the composition of the ferrous alloy liner is:

| Ingredient | Weight Percent |
| --- | --- |
| Carbon | 2.5 to 4.25 |
| Manganese | 0.5 to 1.50 |
| Silicon | 0.25 to 1.25 |
| Chromium | 20 to 35 |
| Nickel | 0.13 to 0.25 |
| Molybdenum | 0.62 to 1.00 |
| Phosphorus | 0.02 to 0.04 |
| Sulfur | 0.02 to 0.03 |
| Vanadium | 0.29 to 0.40 |
| Iron | Balance to make up 100% |

5. The method of claim 2 wherein the cylinder is heated to an O.D. temperature from about 1500° F. to 1900° F. held at such temperature from about 30 to 90 minutes, rapidly cooled to 500° F. to 800° F. and then slowly cooled at a controlled rate until it reaches ambient temperature.

6. The method of claim 5, wherein the slow cooling rate is between about 50° F. and 150° F. per hour.

7. The method of claim 6, wherein the rapid cooling is affected by water quenching and forced air cooling so that the cylinder temperature reaches 500° F. to 800° F. in less than 5 minutes.

8. The method of claim 7, wherein liner is transformed into a martensite structure having a Rockwell C hardness of 58–65.

* * * * *